United States Patent [19]
Kane

[11] Patent Number: 5,394,560
[45] Date of Patent: Feb. 28, 1995

[54] NATIONWIDE SATELLITE MESSAGE DELIVERY SYSTEM

[75] Inventor: John R. Kane, Wellington, Fla.

[73] Assignee: Motorola, Inc., Schaumburg, Ill.

[21] Appl. No.: 954,634

[22] Filed: Sep. 30, 1992

[51] Int. Cl.⁶ .......................................... H04B 7/185
[52] U.S. Cl. ................... 455/12.1; 455/13.1; 455/56.1; 340/311.1; 340/825.44
[58] Field of Search .............. 455/12.1, 13.1, 13.2, 455/33.1, 51.1, 51.2, 54.1, 56.1; 340/825.44, 825.03, 311.1; 379/57, 58; 370/97, 104.1

[56] References Cited

U.S. PATENT DOCUMENTS

| | | | |
|---|---|---|---|
| 4,178,476 | 12/1979 | Frost . | |
| 4,506,384 | 3/1985 | Lucas . | |
| 4,577,060 | 3/1986 | Webb et al. . | |
| 4,644,347 | 2/1987 | Lucas et al. . | |
| 4,713,780 | 12/1987 | Schultz et al. . | |
| 4,734,694 | 3/1988 | Umetsu et al. . | |
| 4,941,170 | 7/1990 | Herbst . | |
| 5,008,952 | 4/1991 | Davis et al. | 455/12.1 |
| 5,010,317 | 4/1991 | Schwendeman et al. | 455/12.1 X |
| 5,081,703 | 1/1992 | Lee | 455/13.1 |
| 5,239,670 | 8/1993 | Schwendeman et al. | 455/13.1 |

OTHER PUBLICATIONS

"EMBARC^SM Advanced Messaging by Motorola", RC-5-60, Motorola, Inc., Sep. 1992.

Primary Examiner—Reinhard J. Eisenzopf
Assistant Examiner—Chi H. Pham
Attorney, Agent, or Firm—Philip P. Macnak; John H. Moore

[57] ABSTRACT

A multi-regional message delivery system (100) delivers messages from a central hub (108) to a number of message transmission regions (102,104,106) for transmission of the messages therein. The central hub 108) receives messages, encodes the messages, and transmits the encoded messages in a number of message data pipes (304) in a message delivery signal (302). A satellite (122) receives the transmitted message delivery signal (302) and then transmits the message delivery signal (302) to a number of regional stations (130,132,134) located in the message transmission regions. The regional stations receive the transmitted message delivery signal (302), select at least one of the data pipes (304) in the message delivery signal (302), and transmit the encoded messages within the message transmission regions.

5 Claims, 5 Drawing Sheets

FIG. 7

NATIONWIDE SATELLITE MESSAGE DELIVERY SYSTEM

FIELD OF THE INVENTION

This invention relates generally to message communication systems, such as for electronic mail systems, and more specifically to a satellite one-way message communication system for delivering messages to at least one portable receiving unit.

BACKGROUND OF THE INVENTION

There is a strong trend in the marketplace for delivering messages in a one-way communication system, such as a paging system, over wide geographic areas. Subscribers of such a service typically desire to roam over distant geographic areas, such as different cities that are possibly in different states of the country, and be able to receive messages from originating parties or callers while the subscribers are roaming from point-to-point. Normally, the subscriber carries on their person a portable selective call receiver for receiving the messages transmitted by the communication system over the wide geographic coverage areas. The selective call receiver typically includes a receiver that is tuned to receive communication over a paging communication channel. It is therefore very desirable to maintain a single paging communication channel for delivering these messages to the roaming subscribers over the wide geographic coverage areas.

Regrettably, although it is very desirable to maintain the operation of the roaming selective call receiver at a single paging communication channel, current paging communication technology typically supports 1200 baud data delivery rate which under normal use can support only approximately 1,000 to 2,000 users in a communication system employing a single paging channel. The required cost of infrastructure to support a messaging communication system over one or more wide geographic coverage areas, such as in a nationwide paging system, are prohibitive for supporting such a small number of subscribers. Therefore, there's a strong need in the marketplace for providing message delivery over a paging communication channel over a wide geographic coverage area, such as a nationwide paging system, while servicing large numbers of subscribers to make the communication system economically viable.

SUMMARY OF THE INVENTION

According to an embodiment of the present invention, there is provided a multi-regional message delivery system for delivering messages from a central hub to a plurality of message transmission regions for transmission of the messages therein. The central hub receives messages and encodes the messages into a predetermined signalling protocol. It then assigns the encoded messages into a plurality of message data pipes corresponding to a plurality of message transmission regions, generates a message delivery signal including the message data pipes, and transmits the message delivery signal to a satellite over a first satellite communication channel. The satellite receives the transmitted message delivery signal over the first satellite communication channel, and then transmits the received message delivery signal over a second satellite communication channel, the satellite being positioned for at least partially covering the predetermined number of message transmission regions with the transmission of the message delivery signal over the second satellite communication channel. A plurality of regional stations are located in the predetermined number of message transmission regions and receive the transmitted message delivery signal over the second satellite communication channel, select at least one of the plurality of data pipes in the message delivery signal, and transmit the encoded messages within the at least one of the predetermined number of message transmission regions.

DESCRIPTION OF A PREFERRED EMBODIMENT

Figure 1:
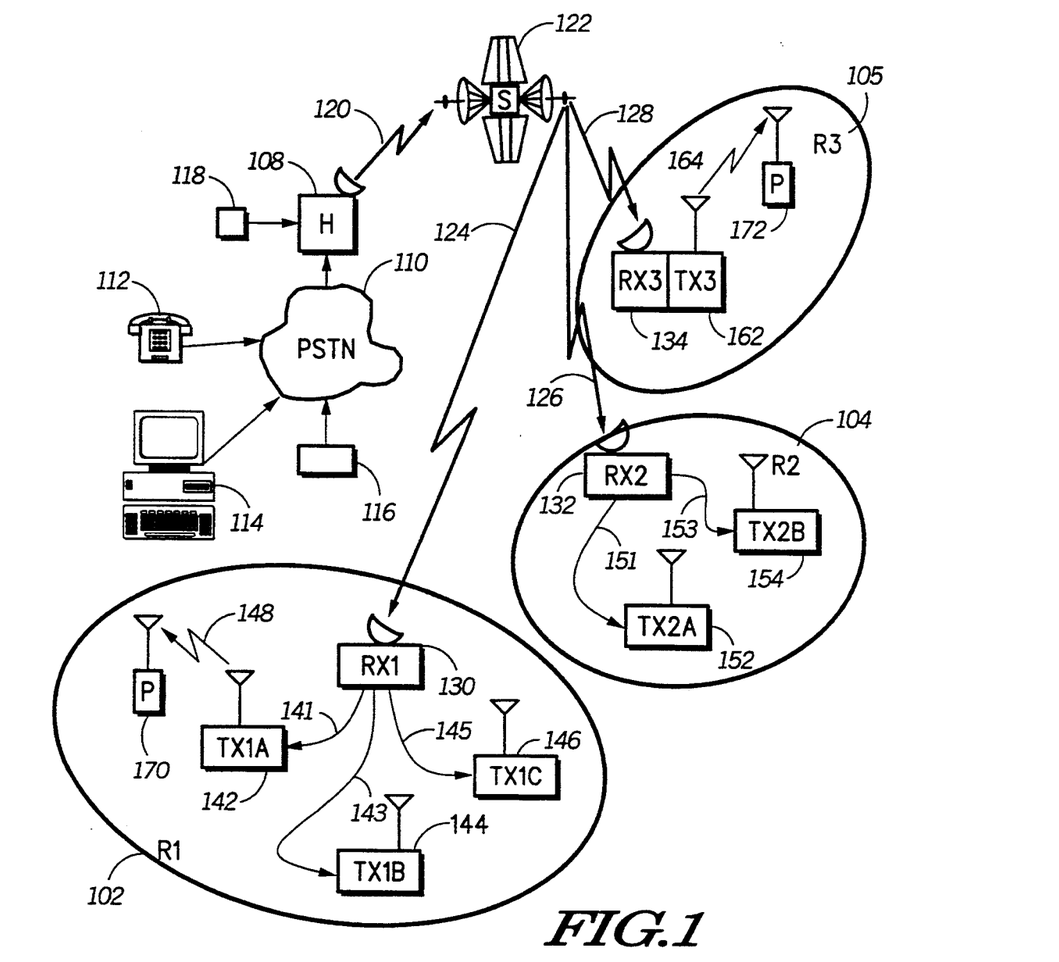
FIG. 1 is an electrical block diagram illustrating a nationwide paging system, in accordance with the preferred embodiment of the present invention.

FIG. 1 illustrates a multi-regional nationwide paging system 100, in accordance with the preferred embodiment of the present invention. Multiple regions 102, 104, 106, of the wide area paging system 100 are strategically located to cover geographic areas for the subscribers of the communication system 100. Preferably, these regions 102, 104, 106 are non-overlapping. That is, for example, message transmission over region one 102 is relatively independent of message transmission in the other regions 104, 106. Likewise, message transmission in each of the other regions 104, 106, is independent of message transmission in other regions of the communication system 100. In this way, messages can be delivered to roaming subscribers in region one 102 without interfering with messages being delivered to roaming subscribers in region two 104 and in region three 106, respectively. Additionally, in the preferred embodiment, the paging channel frequency for region one 102 is the same as the paging channel frequency for region two 104 and the paging channel frequency for region three 106. This single paging channel frequency for all the non overlapping regions 102, 104, 106, of the wide area communication system 100 provides the following significant advantages. First, subscribing selective call receivers can be tuned to operate on the single paging channel frequency for receiving messages over any one of the coverage regions 102, 104, 106. A selective call receiver can easily roam from region to region without having to change its reception characteristics or having to tune to different paging channel receiving frequencies. Second, the single paging channel frequency provides efficient use of the spectrum which is already severely crowded in most metropolitan areas. Third, the roaming selective call receivers can be simpler and more economical to manufacture since each receiver only operates at a single paging channel receiving frequency.

Typically, the communication system 100 includes a central hub 108 which receives page requests from a number of originating devices 112, 114, 116, 118, that input messages into the communication system 100 through different interfaces into the central hub 108. For example, telephone callers 112, personal computers or workstations 114 utilizing modem communication, or other originating terminal equipment 116, can couple page requests through dial-up telephone lines in the public switched telephone network (PSTN) 110 to the central hub 108. Alternatively, local terminal equipment 118, such as a local area network (LAN) or other computing devices, can interface with the central hub 108 for originating page requests through the central hub 108. These originating devices 112, 114, 116, 118 can send messages through the central hub 108 to one or more selective call receivers 170, 172, roaming over the coverage regions 102, 104, 106.

The central hub 108 processes page requests from the originating devices 112, 114, 116, 118, and codes messages from the page requests, and transmits the messages using satellite communication 120 with a satellite transceiver 122. The satellite transceiver 122 is preferably located in a geostationary position relative to the geographic coverage areas designated by the regions 102, 104, 106. The satellite transceiver 122 then transmits the messages to the regions 102, 104, 106, using satellite communication 124, 126, 128. The satellite communication 120 to the satellite transceiver 122, and the satellite communication 124, 126, 128, from the satellite transceiver 122 utilizes current satellite technology. Each of the regional coverage areas 102, 104, 106, includes a satellite receiving earth station 130, 132, 134, that receives the respective satellite communication 124, 126, 128, from the satellite transceiver 122. In this way, the central hub 108 delivers messages to the multiple non overlapping coverage regions 102, 104, 106, using satellite communication. Preferably, the satellite communication 120 from the central hub 108 to the satellite transceiver 122 comprises at least one satellite communication channel. Further, the satellite communication 124, 126, 128, from the satellite transceiver 122 to the multiple regions 102, 104, 106, utilizes one or more satellite communication channels 124, 126, 128.

Each of the satellite receiving stations 130, 132, 134, is coupled to one or more paging transmitting base stations in their respective coverage region 102, 104, 106. For example, the first receiving station 130 is coupled through wire line or telephone line interfacing 141, 143, 145, to three simulcast paging transmitting base stations 142, 144, 146, for covering the first region 102 with transmissions 148 over the paging communication channel. A selective call receiver, or paging receiver 170, located in region one 102 can receive any transmitted messages over the paging communication channel 148. Likewise, the second region 104 includes two simulcast transmitting paging base stations 152, 154, coupled to the satellite receiving station 132 via wire line or telephone line interfacing 151, 153. Further, the third region 106 as shown includes a paging transmitting base station 162 being locally coupled with the satellite receiving station 134. Although a single satellite receiving station 130, 132, 134, is shown servicing a respective coverage region 102, 104, 106, any number of satellite receiving stations can service each coverage region, as necessary, where each of the satellite receiving stations is coupled to at least one paging transmitting base station.

In the third coverage region, messages can be transmitted by the paging transmitting base station 162 over the paging channel 164. A selective call receiver 172 in the third coverage region 106 can receive transmitted messages over the paging channel 164. The operation of a paging receiver 170, 172, of the general type shown in FIG. 1 is more fully described in U.S. Pat. No. 4,518,961, issued May 21, 1985, entitled "Universal Paging Device With Power Conservation", which is assigned to the same assignee as the present invention and is incorporated herein by reference.

Figure 2:
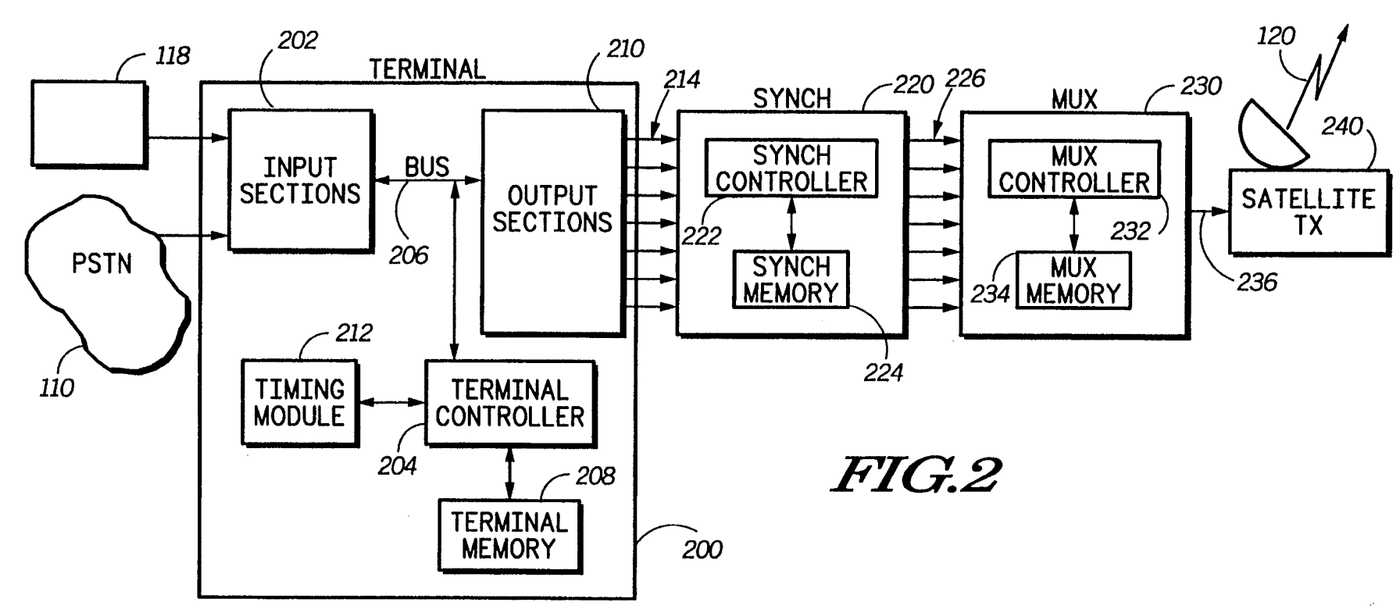
FIG. 2 is an electrical block diagram of the central hub of FIG. 1, according to the preferred embodiment of the present invention.

FIG. 2 is an electrical block diagram of the central hub 108 according to the preferred embodiment of the present invention. A central terminal 200 is coupled to the public switch telephone network (PSTN) 110, and also coupled to the local terminal interface 118. The input sections 202 of the central terminal 200 can receive page requests from the originating devices, as discussed earlier. The input sections 202 then couple the page requests to a terminal controller 204 through a bus 206. The terminal controller 204 can then store the messages in a terminal memory 208 for subsequent transmission. The general operation of a communication system comprising a paging system of the type shown in FIG. 2 is more fully described in U.S. Pat. No. 5,138,311, issued Aug. 11, 1992, entitled, "Communication System Having Adaptable Message Information Formats", which is assigned to the same assignee as the present invention and is incorporated herein by reference.

After the messages are stored in the memory 208, the terminal controller 204 can couple the messages to output sections 210 which preferably encode the messages in a paging protocol, such as the Post Office Code Standardisation Advisory Group (POCSAG) protocol, and then route the encoded messages through output paths 214. The central terminal 200 typically routes messages through each of the output paths 214 for destination to a different one of the coverage regions 102, 104, 106. Although, this is not necessarily always the case. The terminal controller 204 can also utilize a timing module 212 to keep track of time and date information that is maintained preferably in the terminal memory 208 for delivering messages to the subscribers of the communication system 100 in a manner that will be more fully discussed below.

Typically, the encoded messages are transmitted from the output sections 210 of the central terminal 200 over the independent output paths 214 in relatively asynchronous fashion. Consequently, a synchronizing module 220 receives the transmitted messages over the output paths 214 from the central terminal 200 and time synchronizes the previously asynchronous messages to each other before routing to the next stage in the communication system 100. The synchronizing module 220 includes a synchronizing controller 222 and a synchronizing memory 224 that operate to receive the multiple channels of asynchronous messages 214 and then synchronize the multiple channels of message information to each other before routing to multiple output paths 226 from the synchronizing module 220. Preferably, the bits in the messages that are being routed over parallel channels 214 are bit synchronized to each other over the parallel paths 226 to provide time synchronization between the multiple output paths 226 from the synchronizing module 220.

These multiple message output paths 226 can carry paging messages preferably encoded using 1200 baud POCSAG encoding. Further, the multiple channels 226 are timed synchronized between their respective bits of 1200 baud POCSAG information. Normally, the 1200 baud POCSAG is asynchronously transmitted from the output sections 210 of the central terminal 200, and then time synchronized through the synchronization module 220. The time synchronized bit streams 226 are then routed to a multiplexer (MUX) module 230 which includes a mux controller 232 and a mux memory 234. The multiplexer module 230 combines six 1200 baud POCSAG bit streams into one 9600 baud output stream 236 which is delivered to a satellite transmitting station 240. The 9600 baud signal routed through the output path 236 of the multiplexer module 230 to the satellite transmitting station 240 is then transmitted 120 to the satellite transceiver 122 (FIG. 1) for delivering the messages to the coverage regions 102, 104, 106.

Figure 3:
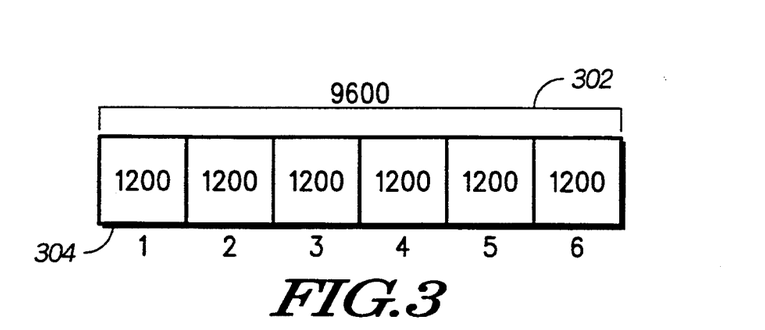
FIG. 3 is a timing diagram illustrating multiple data pipes in a communication channel according to the preferred embodiment of the present invention.

As shown in FIG. 3, a 9600 baud signal 302 includes six 1200 baud data pipes 304. Each data pipe handles a 1200 baud POCSAG communication, where the six 1200 data pipes are timed division multiplexed into the 9600 baud transmission 302.

Figure 4:
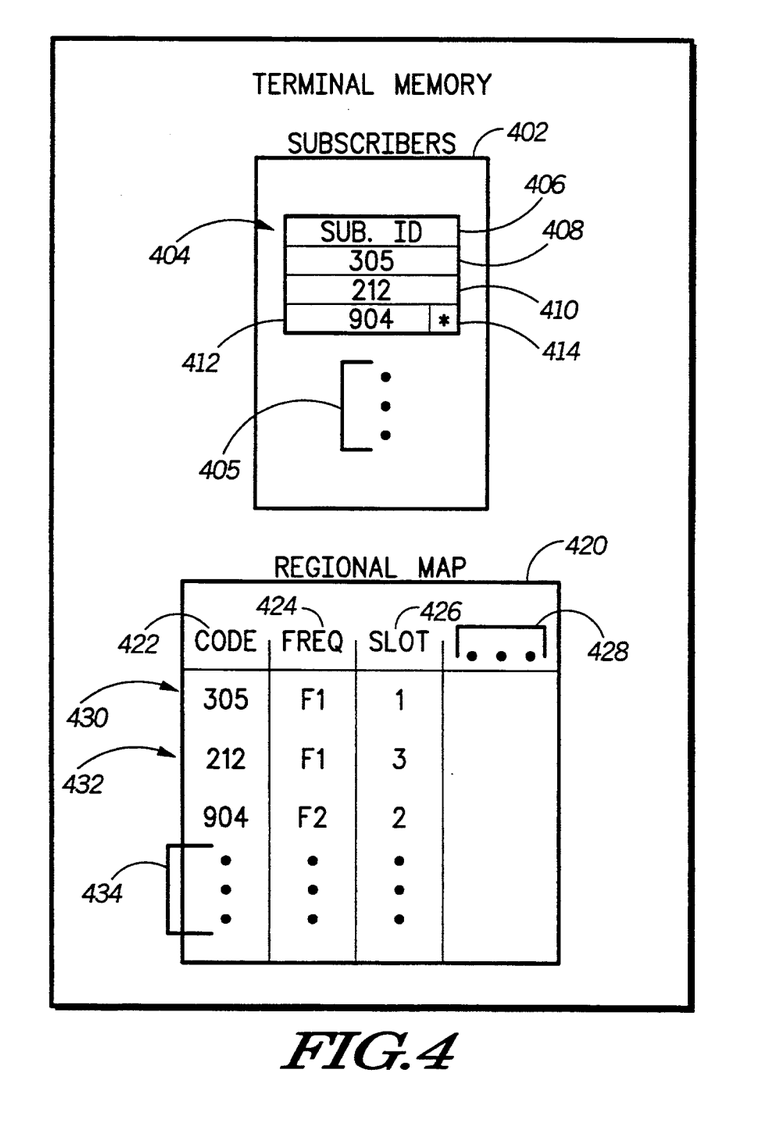
FIG. 4 is a memory block diagram illustrating subscriber records in a subscriber data base and a regional map table stored in a memory of the terminal of FIG. 2, according to the preferred embodiment of the present invention.

As shown in FIG. 4, the terminal memory 208 includes at least two data structures for routing messages between the central hub 108 and the one or more destination selective call receivers 170, 172. Preferably, a subscribers data base 402 in the terminal memory 208 identifies subscriber records 404 for each of the subscribers of the communication system 100. Each of the subscriber records 404, 405, include a subscriber ID 406 and a destination code 408, 410, 412. The destination code 408, 410, 412, helps identify the one or more regions for transmitting the message to the roaming selective call receiver 170, 172. Preferably, the regions 102, 104, 106, are identified by an area code such as shown for the destination codes 408, 410, 412. For example, the first destination code 408 identifies the area code 305 for transmitting the message to the particular subscriber identified by the subscriber ID 406 in the subscriber record 404. When a caller initiates a page request to the particular subscriber of the subscriber record 404 the central terminal 200 looks up the subscriber ID 406 in the subscriber data base 402 and then can determine from the area code 408 the destination region for transmitting the message to the roaming selective call receiver of the particular subscriber. Once the destination code 408 is retrieved from the subscriber record 404 the terminal controller 204 can then access a regional map table 420 in the terminal memory 208 to convert a logical representation of the destination of the message, as represented by the area code 305, to a physical representation of the system of the transmission path required to deliver the message to the selective call receiver in the coverage region. The regional map table 420 maps one or more area codes 422 to one or more satellite channel frequencies 424 and one or more data pipe slots 426 in a communication channel. Additional satellite channel frequencies and data pipe time slots are represented 428 in the regional map table 420 for each of the area codes 430, 432, 434, as may be necessary. Hence, a destination code, such as area code 305 shown in the regional map table 420 represents a series of information 430, including a frequency, e.g., frequency F1, and a time slot or data pipe in a satellite communication channel, e.g., 1200 baud time slot one.

Other destination codes 410, 412, can be included with a subscriber record 404 for identifying one or more coverage regions for delivering messages to a roaming subscriber. For example, a subscriber may be roaming between area code 305 and 212 and may wish to have both codes included in their subscriber record. Further, a subscriber may roam a particular coverage region identified by area code 904 for a predetermined time interval. Hence, the subscriber can have the destination code 412 included in their subscriber record 404, where a time information 414 is also included in the subscriber record 404 to enable the particular destination code 412 during the defined interval 414. The central terminal 200 can utilize the timing module 212 to verify time information such as when a page request is received at the central terminal 200 the terminal controller 204 can verify whether the subscriber record 404 includes an itinerary of one or more destination codes 412 that are enabled during the particular time interval 414 for delivering the message to the coverage region. Therefore, a subscriber of the communication system 100 can configure a subscriber record 404 in the subscribers data base 402 such that a coverage region is identified for transmitting messages to the selective call receiver of the subscriber. When the subscriber roams between coverage regions, multiple entries 408, 410, in the subscriber record 404 can identify multiple destinations for delivering the messages to the roaming subscriber. Further, a defined time interval can be used to enable a particular destination code 412 for the subscriber record 404.

When a subscriber record 404 identifies multiple destination codes 408, 410 for delivering a message to a roaming subscriber, the message may be delivered over one or more satellite communication channels 430, 432, or one or more time slots in a single satellite communication channel. The communication system 100 can grow in the number of regions, and can reorganize the existing regions over the defined destination codes without impacting the logical destination codes already stored in existing subscriber records 404, 405. This allows significant flexibility in administering the communication system 100, and in configuring and changing the communication system without impacting existing subscribers of the communication system 100. By changing the frequency 424, and the time slot 426 of a particular satellite communication channel, or adding frequencies and time slots 428 for additional satellite communication channels mapped to the existing destination codes 422, the regional map table 420 allows changes in the physical characteristics of the message delivery paths of the communication system without changing the subscriber records 404, 405, in the subscriber data base 402. Hence, the existing subscribers and originating callers are not inconvenienced by any changes to the communication system as the system grows and changes.

Figure 5:
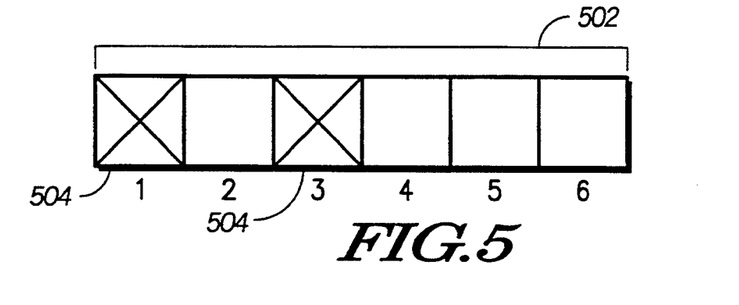
FIG. 5 is a timing diagram showing exemplary data pipes delivering message data in a paging communication channel, according to the preferred embodiment of the present invention.

As an example, shown in FIG. 5, a roaming subscriber in the communication system 100 can be configured in the subscriber data base 402 with the subscriber record 404 including a first destination code 408 identified by area code 305, and a second destination code 410 identified by area code 212. As further illustrated in the regional map table 420, the first destination code is mapped in the regional map 430 to a satellite communication channel having a channel frequency 424 of F1, and a time slot 426 or data pipe being the first of six data pipes for that satellite communication channel. Further, the second destination code is mapped in the regional map 432 to the satellite communication channel having the frequency 424 of F1, and the time slot 426 being the third time slot of six time slots for the satellite communication channel. Hence, a message originated at the central hub 108 for the particular subscriber of the subscriber record 404 would be transmitted over two data pipes in a satellite communication channel as shown in FIG. 5. The first data pipe 504 corresponds to the first entry in the regional map table 430, and the second data pipe 506 corresponds to the second entry in the regional map table 432. Hence, two copies of the message would be transmitted over the two data pipes 504, 506, at 1200 baud POCSAG communication each in the 9600 baud satellite communication 502. Each of two regions, such as region one 102 (FIG. 1) and region three 106, would have its receiving earth station 130, 134, tuned to receive satellite transmission over the satellite communication channel at 9600 baud data rate. That is, the transmission 124, 128, from the satellite transceiver 122 to the first and third regions 102, 106 is over the same satellite communication channel but at two different 1200 baud time slots within the 9600 baud transmission over the communication channel. Each of the receiving earth stations 130, 134, would receive the satellite communication and then would extract the 1200 baud data from the particular time slot for the respective satellite receiver 130, 134, as will be more fully discussed below. In this way, the communication system 100 can deliver a message from the central hub 108 to one or more regions 102, 106, using satellite communication at a higher data rate than the actual data rate of the message being delivered to each of the coverage regions 102, 106. This allows transmissions over multiple satellite communication channels between the central hub 108 and the different satellite receiving stations 130, 134, and also allows time division multiplexing of multiple messages over a single satellite communication channel, which allows significant flexibility in configuring the distribution path of messages originating at the central hub 108.

Figure 6:
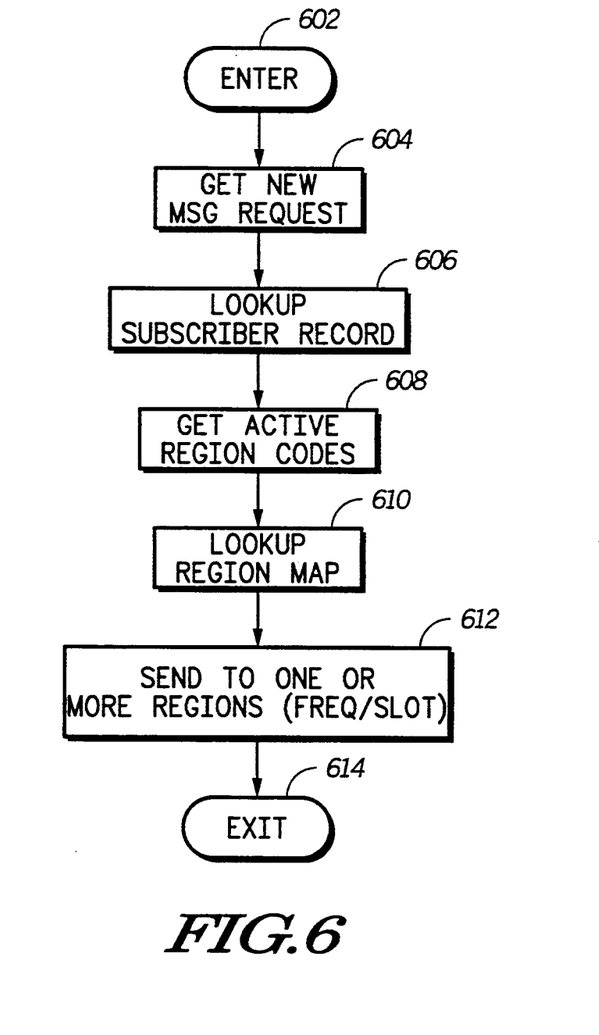
FIG. 6 is a first operational flow diagram for the terminal controller of FIG. 2, according to the preferred embodiment of the present invention.
Figure 7:
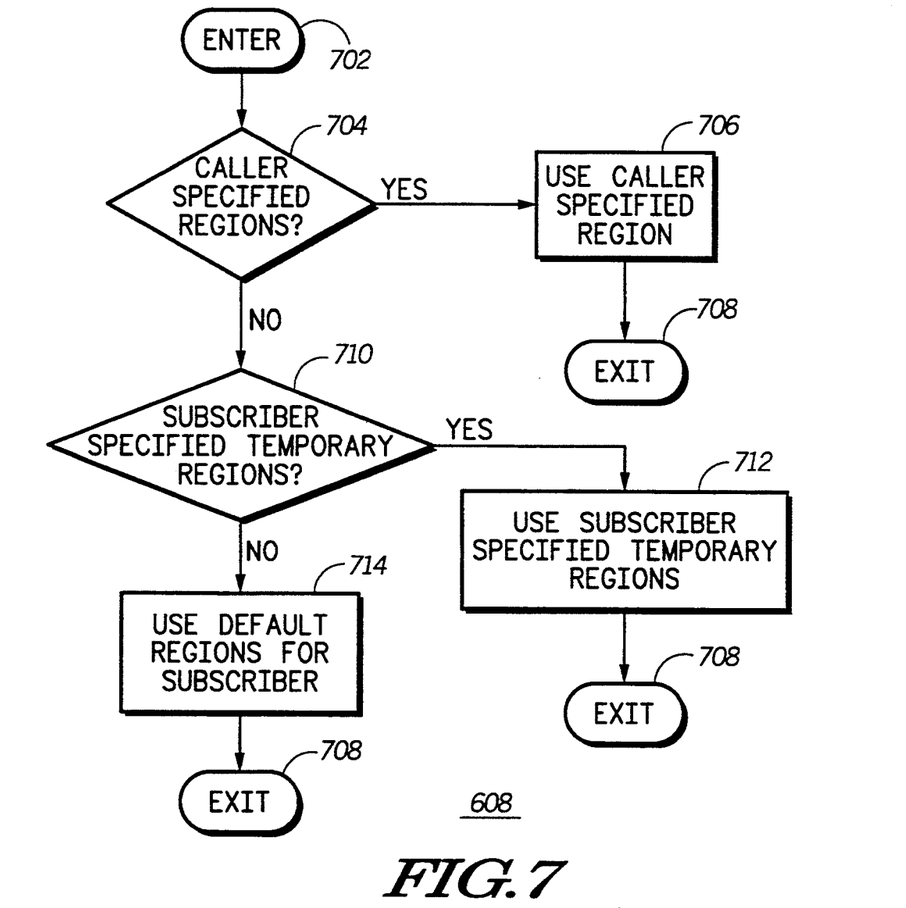
FIG. 7 is a second operational flow diagram for the terminal controller of FIG. 2, according to the preferred embodiment of the present invention.

FIGS. 6 and 7 show two operational sequences for the terminal controller 204 for handling page requests, according to the preferred embodiment of the present invention. When a new message request is received 602, 604, by the terminal controller 204, the terminal controller 204 performs a look-up 606 in the subscriber data base 402 to access a subscriber record identified by a subscriber ID in the page request. As discussed earlier, the subscriber record 404 identifies the 608 the destination codes that are available for delivering messages to the subscriber corresponding to the subscriber record 404. Further, as discussed before, certain destination codes 412 may be active during certain predefined time intervals. Once the controller 204 gets 608 the active region codes from the subscriber record 404 the controller 204 performs a look-up 610 in the regional map table 420 to determine the physical message delivery path for the communication system. Subsequently, the controller 204 sends the message through one or more output sections 210 to one or more coverage region as defined by the frequency 424 of a satellite communication channel and the particular time slot 426 or data pipe within a satellite communication channel. After the terminal controller 204 sends 612, 614 the message to one or more destination regions, the controller 204 continues performing other functions for the central terminal 200.

Specifically, the terminal controller 204 preferably follows the operational sequence shown in FIG. 7 when determining the active region codes 608 for a particular subscriber for sending a message thereto. First, the terminal controller 204 verifies the page request 702, 704, to determine if the caller or originator specified the destination code for one or more coverage regions to send the message to the roaming subscriber. If the originating caller in the page request specified 704 one or more destination codes for coverage regions, then the controller will use the caller specified destination codes 706, 708, when the controller 204 then performs a look-up into the region map table 420. If the page request does not specify a particular destination code 704, then the controller 204 checks 710 the subscriber record 404 to determine if the subscriber has specified any destination codes for delivering messages while the subscriber is roaming over one or more coverage regions. If the subscriber has specified one or more additional destination codes, such as the destination code 410 for area code 212 and the destination code 412 for area code 904, then the controller 204 will use 712 the particular destination codes 410, 412 from the subscriber record 404, and then go 708 to look up the particular destination codes 410, 412, in the regional map table 420 for use in delivering the message to the roaming subscriber. On the other hand, if the subscriber has not specified 710 any additional destination codes, the subscriber record 404 includes a default destination code 408 which the controller 204 will use 714 to define the destination of the message. That is, if a caller does not specify a destination code, and the subscriber has not modified the subscriber record 404 to define additional destination codes, then the terminal controller 204 always has a default destination code 408 in every subscriber record 404 to identify the destination of a message in the communication system 100. The controller 204 then goes 708 to look up the default destination code 408 in the regional map table 420 to determine the physical path that the message must travel to be delivered to the roaming subscriber. In this way, as illustrated in FIG. 7, the central terminal 200 can utilize a number of routing mechanisms through the subscriber data base 402 and the regional map table 420 in the terminal memory 208, to deliver messages over one or more coverage regions in the communication system 100. This provides significant flexibility to the communication system 100, and allows a subscriber to conveniently define a fixed or a time based itinerary for delivering messages to the roaming subscriber as necessary.

Figure 8:
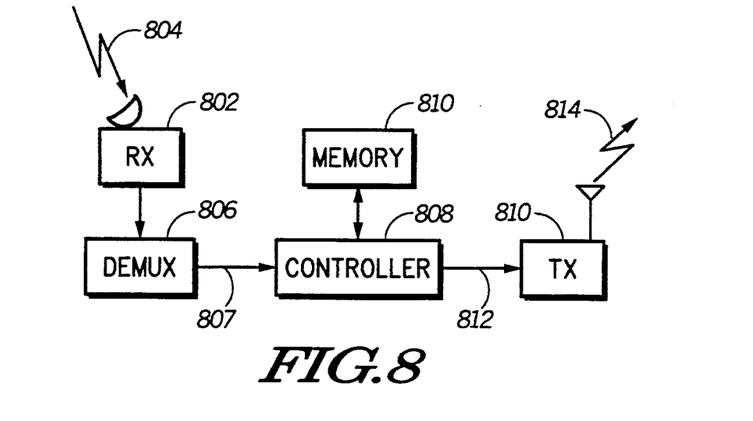
FIG. 8 is an electrical block diagram showing a regional receiving station and paging transmitter base station, in accordance with the preferred embodiment of the present invention.

FIG. 8 is an electrical block diagram illustrating a satellite receiving earth station being coupled 812 to a paging transmitting base station 810 for delivering messages to a coverage region in accordance with the preferred embodiment of the present invention. The received satellite signal 804 is received by the satellite receiving station 802 and then forwarded to a demultiplexing circuitry 806. The demultiplexing circuitry 806 is configured to select one of six data pipes or time slots from within the 9600 baud satellite transmission. Additionally, the satellite receiving station 802 is configured (or tuned) to received communication from a predetermined satellite communication channel. Hence, after receiving 802 the satellite transmission 804 and then demultiplexing 806 the received signal to select one of six data pipes in the received signal, the output 807 of the demultiplexing circuitry 806 presents a 1200 baud POCSAG signal that includes the message information for delivery over the coverage area served by the paging transmitting base station 810. The controller 808 preferably stores the page information in memory 810 and then at an appropriate time couples 812 the paging information, including the message, to the paging transmitting base station 810 for transmission 814 over the coverage area. Therefore, the satellite receiving earth station can receive messages over satellite communication 804 from one of six data pipes which are part of a transmission over a satellite communication channel. By allowing the individual earth stations to have the satellite receiver 802 tuned to communicate over a satellite communication channel and then having the demultiplexing circuitry 806 select one of six data pipes delivering message information over the satellite communication channel, the communication system 100 can be very flexible in defining which data pipes that are mapped to the respective coverage regions. By utilizing the combination of multiple satellite communication channels, and high speed satellite transmission with multiple data pipes within, and by utilizing non overlapping coverage areas 102, 104, 106, the communication system 100 significantly increases the number of subscribers that it can handle at one time. This in turn makes the communication system 100 commercially viable, while providing convenience and flexibility for users of the communication system 100.

What is claimed is:

1. A communication system for delivering messages to portable selective call receivers, the communication system comprising:

a paging terminal for receiving page requests from at least one originating device, processing the page requests, and outputting messages through a plurality of output sections in response to the processed page requests, the messages comprising data bits being outputted at a first predefined data bit rate;

a multiplexing module comprising a plurality of inputs coupled to the plurality of output sections of the paging terminal, respectively, for multiplexing the data bits of the messages being outputted from the output sections into one multiplexed signal comprising the data bits of the messages organized into a plurality of data pipes with each one of the plurality of data pipes corresponding to the data bits of the messages being outputted from each one of the plurality of output sections, respectively, and the multiplexed signal being transmitted from an output of the multiplexing module at a second data bit rate;

a satellite transmitting station having an input coupled to the output of the multiplexing module for receiving the multiplexed signal therefrom, and for transmitting a first satellite transmission including the multiplexed signal over a first satellite communication channel;

a satellite transceiver located over a geographic area for receiving the first satellite transmission including the multiplexed signal over the first satellite communication channel, and transmitting a second satellite transmission including the multiplexed signal over a second satellite communication channel, the satellite transceiver being oriented to cover at least a portion of the geographic area with the second satellite transmission over the second satellite communication channel;

at least one satellite receiving station located in at least one coverage region, within the geographic area, each of the at least one satellite receiving station operating to receive the second satellite transmission including the multiplexed signal over the second satellite communication channel and to provide the multiplexed signal at an output of each of the at least one satellite receiving station;

at least one demultiplexing module corresponding to the at least one satellite receiving station, respectively, each of the at least one demultiplexing module comprising an input coupled to the output of a corresponding one of the at least one satellite receiving station, respectively, for receiving the multiplexed signal at the input, and for selectively demultiplexing a predetermined one of the plurality of data pipes from the multiplexed signal for providing at an output of the at least one demultiplexing module the data bits of the messages organized into the predetermined one of the plurality of data pipes, the data bits being transmitted at the output of the at least one demultiplexing module at the first data bit rate; and at least one paging transmitting base station comprising an input coupled to the output of the at least one demultiplexing module, respectively, for receiving the data bits being transmitted at the output of the at least one demultiplexing module and then transmitting the messages represented by the data bits over a paging communication channel covering at least one coverage region within the geographic area, the paging communication channel providing the messages for reception by at least one selective call receiver located within the at least one coverage region.

2. The communication system of claim 1, wherein the multiplexed signal is transmitted from the output of the multiplexing module at the second data bit rate which is a multiple of the first predefined data bit rate times the number of output sections in the plurality of output sections of the paging terminal.

3. The communication system of claim 1, wherein the satellite transceiver is located in a geostationary position over the geographic area for covering at least a portion thereof with the second satellite transmission.

4. The communication system of claim 1, wherein the paging communication channel for transmitting the messages thereover is the same for each of the at least one coverage region, respectively, within the geographic area.

5. The communication system of claim 1, wherein the paging terminal comprises memory means for storing subscriber information and a regional map, the subscriber information identifying a plurality of regional codes for at least one subscribing selective call receiver that can roam between a plurality of coverage regions identified by the plurality of regional codes, and the regional map mapping the plurality of regional codes into the plurality of data pipes in the multiplexed signal, the subscriber information for the at least one subscribing selective call receiver being modifiable at the memory means to identify an itinerary of a roaming at least one subscribing selective call receiver; and wherein each of the at least one demultiplexing module corresponding to the at least one satellite receiving station, respectively, selectively demultiplexes a predetermined one of the plurality of data pipes from the multi-plexed signal for delivering messages to the respective coverage region over the paging communication channel, the messages being destined for reception by the at least one subscribing selective call receiver that can roam between the plurality of coverage regions identified by the plurality of regional codes.

* * * * *